United States Patent [19]
Nijland

[11] Patent Number: 5,454,573
[45] Date of Patent: Oct. 3, 1995

[54] DAMPER

[75] Inventor: Peter L. J. Nijland, Losser, Netherlands

[73] Assignee: Vernay Laboratories, Inc., Yellow Springs, Ohio

[21] Appl. No.: 144,343

[22] Filed: Nov. 1, 1993

[51] Int. Cl.⁶ ..................... F16J 15/32
[52] U.S. Cl. ........ 277/207 R; 277/97; 277/152; 277/205; 277/215; 384/138
[58] Field of Search ............ 277/97, 152, 160, 277/165, 205, 207 R, 213, 215, 165, 178, DIG. 9; 384/97, 98, 138, 215, 220

[56] References Cited

U.S. PATENT DOCUMENTS

| | | | |
|---|---|---|---|
| 1,483,904 | 2/1924 | Masury | 384/215 |
| 2,907,596 | 10/1959 | Maha | 277/205 |
| 3,322,475 | 5/1967 | Schick | 384/138 |
| 3,854,737 | 12/1974 | Gilliam, Sr. | 277/205 |
| 4,921,258 | 5/1990 | Fournier et al. | 277/152 |
| 5,205,568 | 4/1993 | Stoll et al. | 277/152 |

*Primary Examiner*—Daniel G. DePumpo
*Attorney, Agent, or Firm*—Biebel & French

[57] ABSTRACT

The present invention is a damper seal which is used in sealing a tube, such as a fuel nozzle, into a housing, such as a fuel canister. The damper seal provides increased sealing capabilities as the pressure inside the housing increases and further dampens vibrations which may occur between the housing and the tube. The damper seal includes a damper portion having outer and inner longitudinally extending scallops to define outer and inner contact surfaces for the damper seal. The inner and outer scallops are circumferentially offset from each other to enhance the vibration dampening characteristics of the damper seal. In addition, inner and outer seals having a U-channel located therebetween are provided for sealing against a tube and a housing, respectively, wherein the U-channel facilitates a positive biasing of the inner and outer seals into engagement with cooperating surfaces in the presence of a fluid pressure.

15 Claims, 5 Drawing Sheets

PRIOR ART

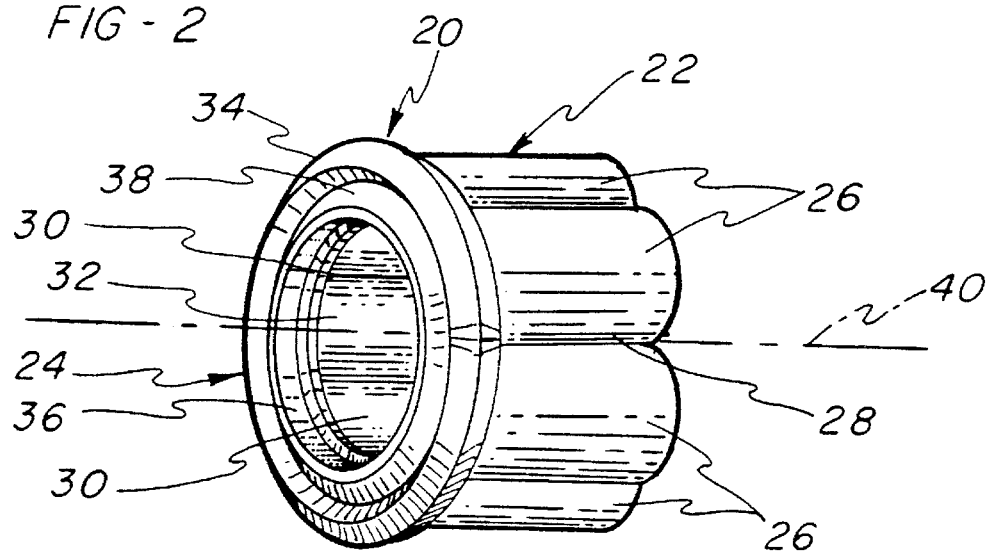
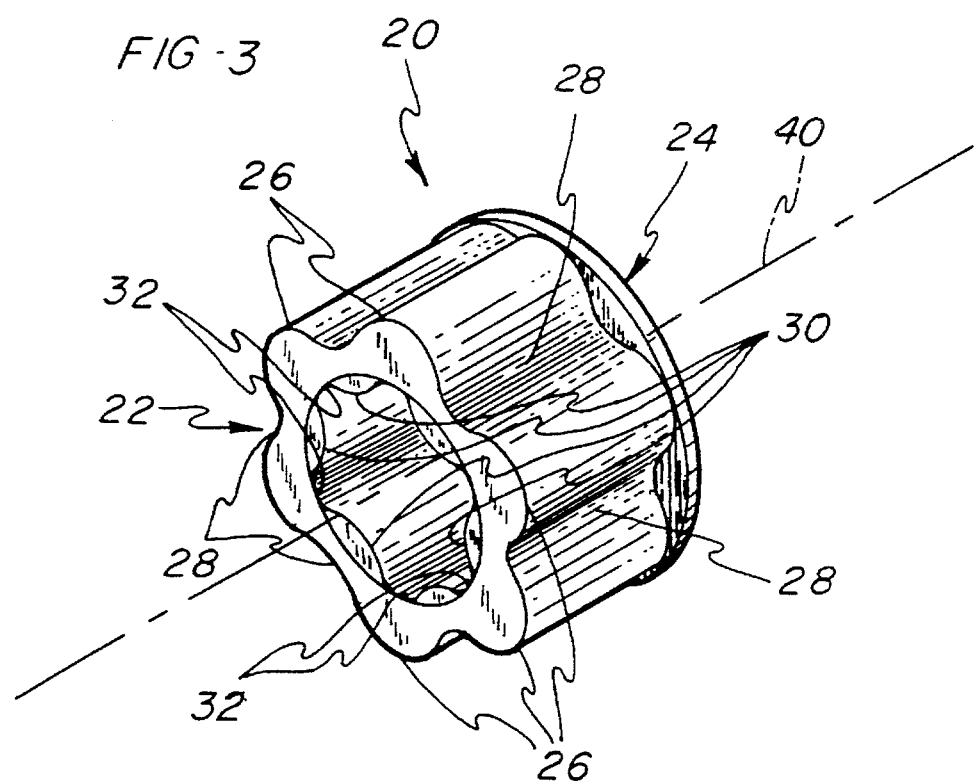

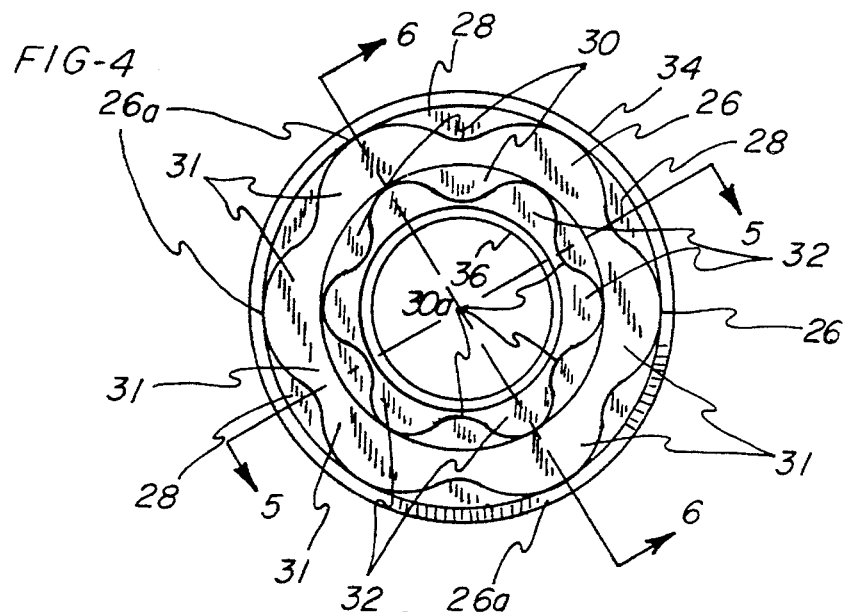
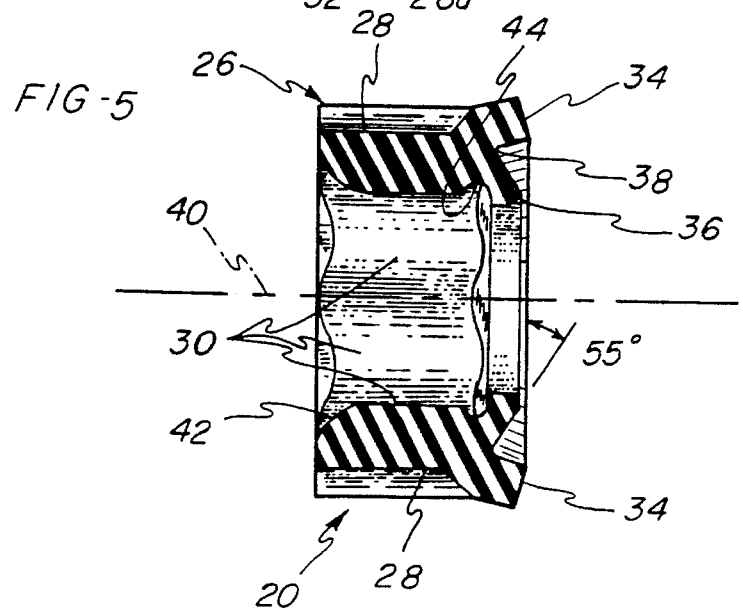
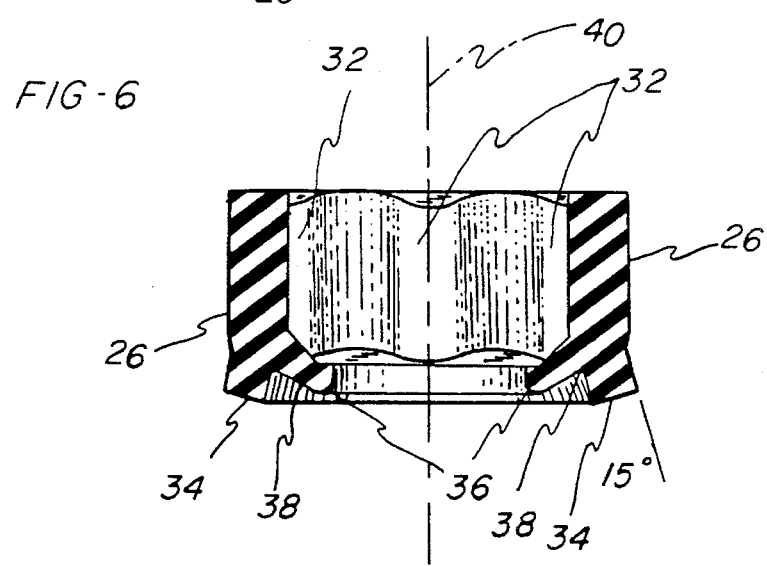

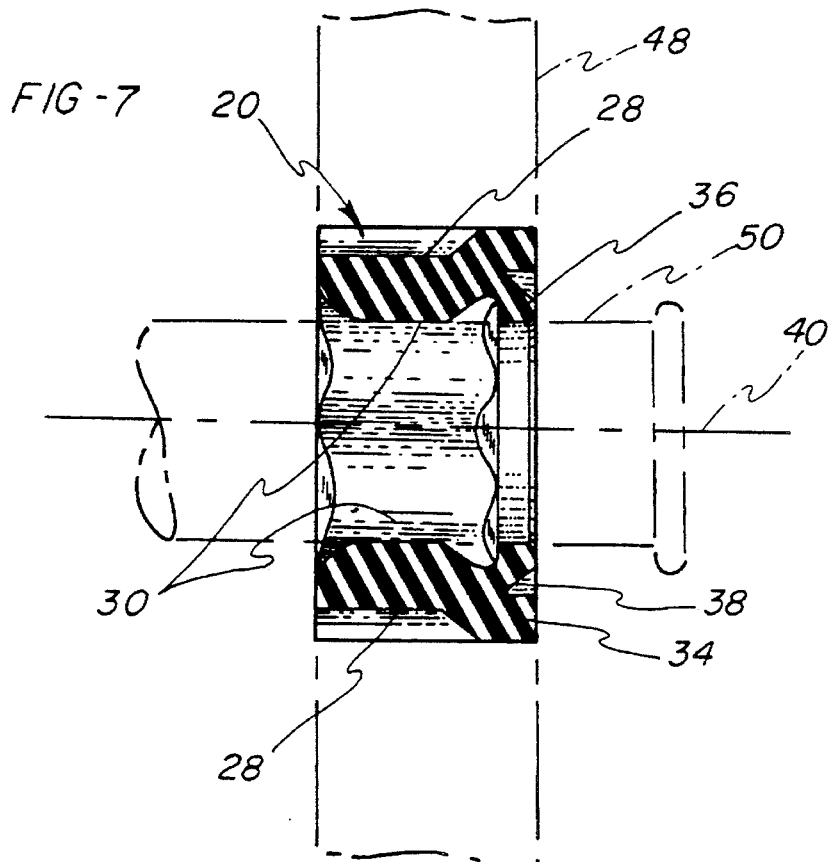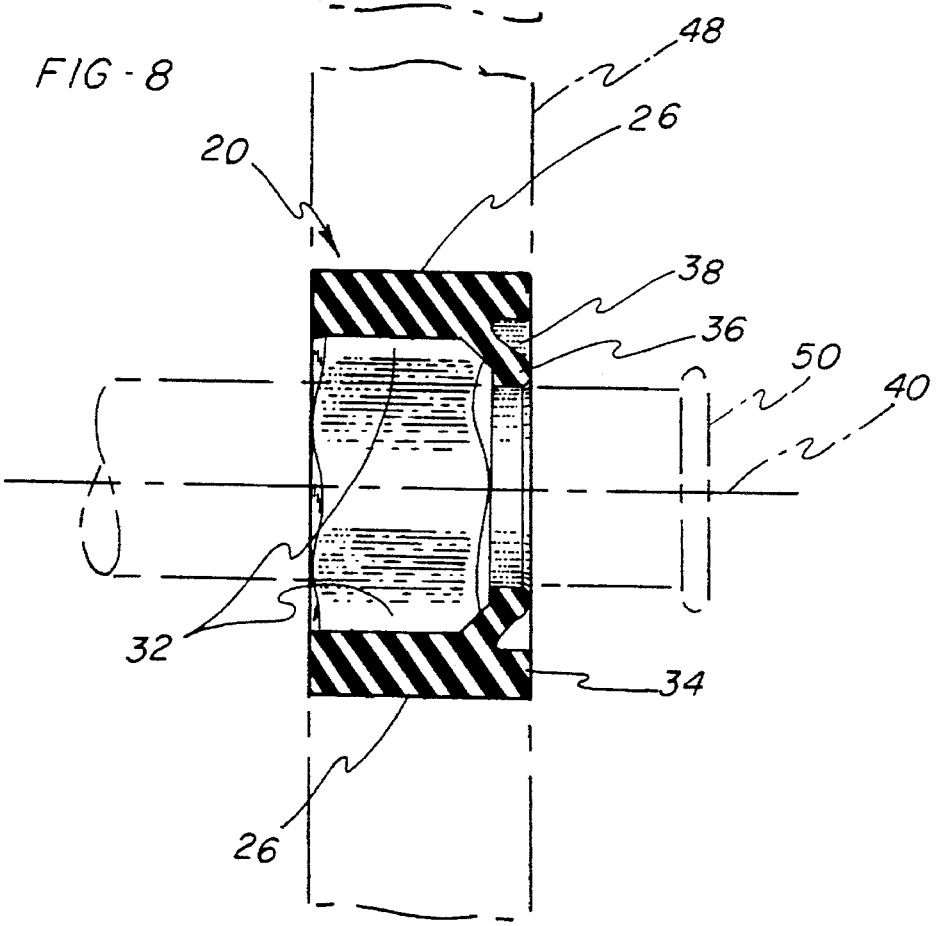

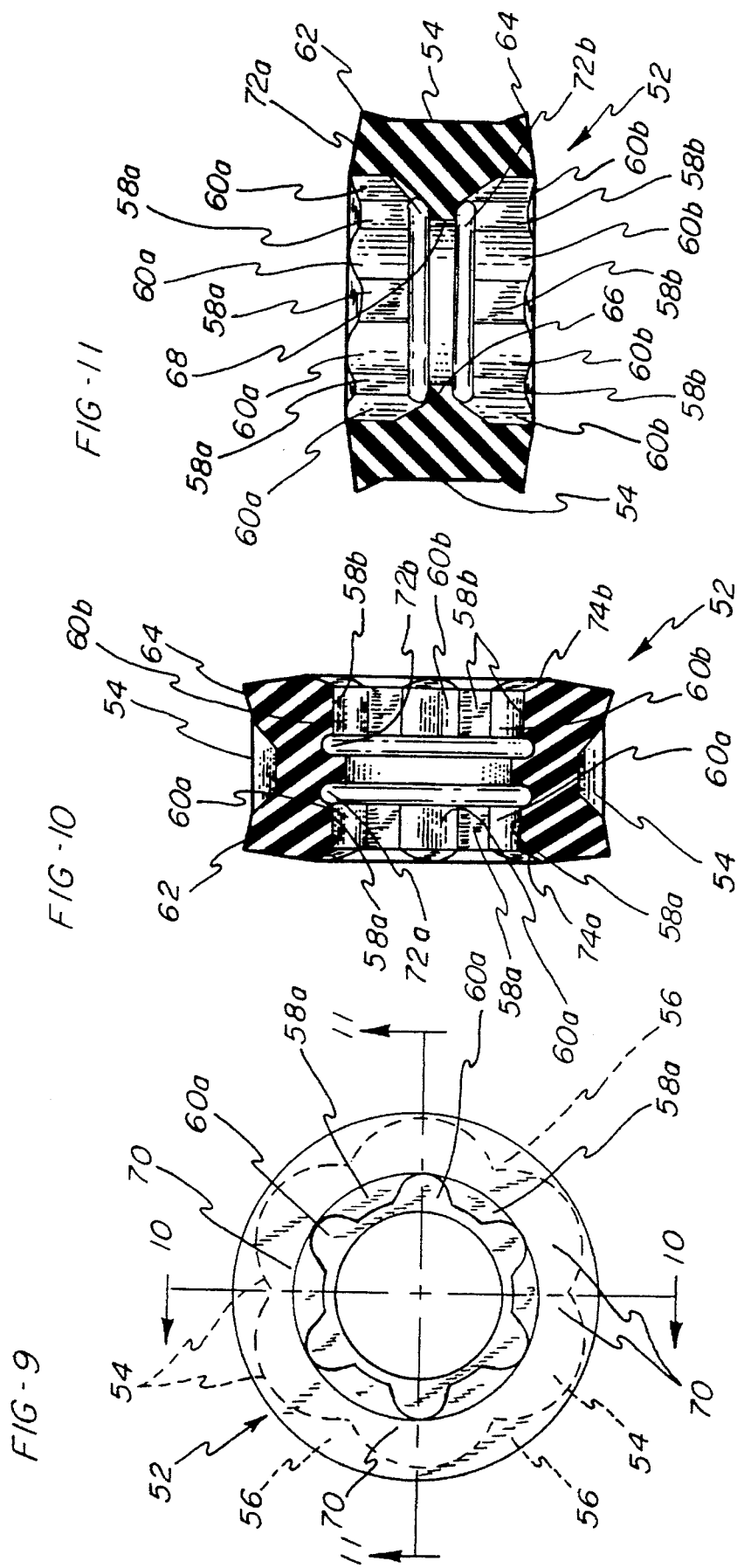

DAMPER

BACKGROUND OF THE INVENTION

This invention relates to a seal for sealing a tube into a housing and, more specifically, to a seal for sealing a fuel pump nozzle into a housing of a fuel sender assembly, wherein the seal has a dual function of providing a fluid-tight seal and of dampening vibrations between the fuel pump and the fuel tank.

In the past there have been attempts to provide a seal which will both seal a tube, such as a fuel nozzle, into a housing and also provide dampening of any vibrations between the tube and the housing. One such prior seal is shown in FIGS. 1A and 1B. A leading edge 12 of the prior seal is tapered in from the outside edge to the inside edge for receiving the fuel pump spout, and a tail end 14 of the seal is formed with a planar surface. The seal is made out of a resilient elastomeric material in order to seal the tube into the housing and also to dampen vibrations between the housing and the tube.

The prior art seal relies on radial pressure exerted between a fuel pump spout and an inside housing diameter in order to provide an effective sealing function. In order to obtain the necessary radial pressure for maintaining a sealed condition between the fuel pump spout and the housing, the prior art seal must be compressed a significant amount such that assembly of the fuel pump spout, seal and housing has proven to be difficult. In addition, when exposed to fuel or fuel vapors, the seal tends to expand or swell excessively thereby increasing the internal forces within the seal and limiting the ability of the seal to function as a dampening element. Further, the internal forces resulting from the swelling of the seal may be so high as to lead to tearing of the seal when the seal is subjected to vibrations.

Another problem associated with the prior art seal relates to the material requirement for the seal. Specifically, since the prior art seal must be compressed a significant amount in order to establish an effective fluid tight barrier between a fuel pump spout and a housing, the seal must be formed of a highly flexible, and relatively expensive, material which is capable of compressing to conform to the space defined between the fuel pump spout and the inside diameter of the housing.

Accordingly, there is a need for a seal for performing a sealing and dampening function between a fuel pump spout and the inside diameter of a housing which is durable and easy to assemble. Further, there is a need for such a seal wherein the seal may be manufactured of a relatively inexpensive material and wherein the dampening function of the seal is substantially unaffected by swelling of the seal resulting from absorption of fuel and fuel vapors.

SUMMARY OF THE INVENTION

The present invention provides an annular damper seal for forming a sealing interface between a tube and a housing wherein the seal comprises an annular outer seal defining a radially outer surface for engaging the housing in sealing relationship, an annular inner seal defining a radially inner surface for engaging the tube in sealing relationship, the outer and inner seals being formed coaxial relative to a longitudinal axis, an annular channel defined by the outer and inner seals and positioned intermediate the outer and inner seals with the channel increasing the sealing of the outer and inner seals against the housing and the tube in response to an increase in pressure within the housing.

A damper portion of the annular damper seal has inner scallops which define longitudinal channels that extend parallel to the longitudinal axis. The inner scallops have inner surfaces for engaging the outer surface of the tube. The damper portion further includes outer scallops defining longitudinal channels extending parallel to the longitudinal axis. The outer scallops have outer surfaces which engage an inner surface of the housing. The inner and outer scallops dampen the vibrations between the tube and the housing. In addition, the inner and outer scallops are circumferentially offset relative to each other such that the longitudinal channels are adapted to accommodate swelling of the seal without significantly increasing the pressure within the material of the seal, and such that space is provided for permitting the seal to expand radially outwardly slightly during insertion of a tube through the seal.

Therefore, it is an object of the present invention to provide a damper seal performing a sealing interface between a tube and a housing.

It is another object of the present invention to provide a damper seal between a tube and a housing which includes a damper portion for absorbing vibrations wherein the performance of the damper portion is substantially unaffected by swelling of the material forming the seal.

Other advantages and objects of the present invention will be apparent from the following description, the accompanying drawings and the appended claims.

BRIEF DESCRIPTION OF THE DRAWINGS

FIG. 2 is a perspective view of the damper seal of the present invention showing the seal portion;

FIG. 3 is a perspective view of the present invention showing the damper portion;

FIG. 4 is an end view showing the damper end of the present invention;

FIG. 5 is a cross-sectional view taken along line 5—5 in FIG. 4;

FIG. 6 is a cross-sectional view taken along line 6—6 in FIG. 4;

FIGS. 7 and 8 are a cross-sectional views similar to FIGS. 5 and 6, respectively, depicting the damper seal installed in a housing with a tube positioned therethrough;

FIG. 9 is an end view of an additional embodiment of the present invention wherein the opposing end view is identical;

FIG. 10 is a cross-sectional view taken along line 10—10 in FIG. 9; and

FIG. 11 is a cross-sectional view taken along line 11—11 in FIG. 9.

DESCRIPTION OF THE PREFERRED EMBODIMENT

Figure 1A:
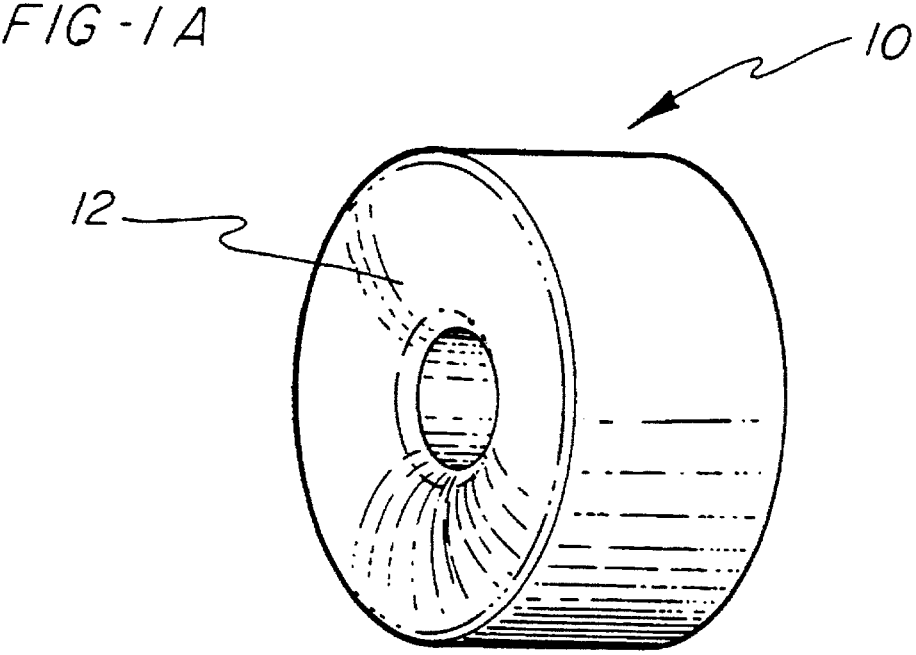
FIG. 1A is a perspective view of the prior art damper seal.
Figure 1B:
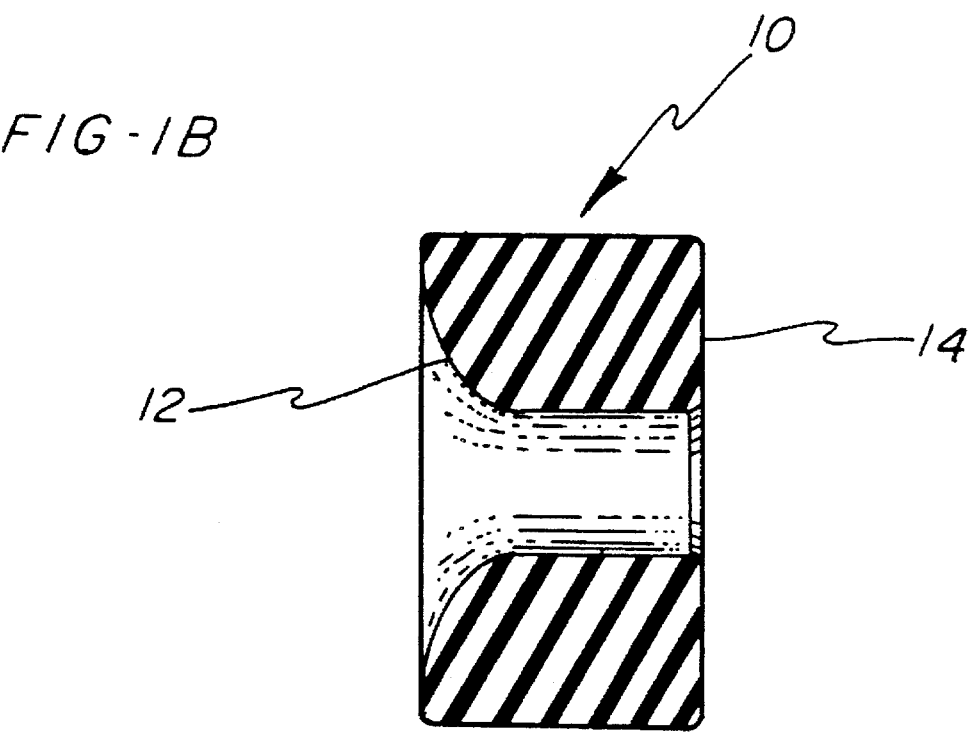
FIG. 1B is a cross-sectional view of the prior art damper seal.

The present invention provides a damper seal including a sealing portion for preventing flow of fluids through a space defined between a housing and a tube and a damper portion for isolating vibrations between the housing and the tube.

The present invention uses a ribbed or scalloped design to dampen the vibration between a tube such as a fuel pump nozzle and a housing such as a fuel canister assembly. Also, the present invention utilizes a seal which has a U-channel for increasing the sealing pressure when the pressure inside the housing increases. This U-channel utilizes the pressure to force the outer portion of the seal against the housing and the inner portion of the seal against the tube.

The use of the scallops allows the damper seal of the present invention to use less material and a less expensive material in order to perform the dampening function. Furthermore, the scallops of the present invention engage the housing and the fuel nozzle at staggered opposing points thereby enhancing the dampening characteristics and allowing the damper seal to expand, such as when fuel soaks into the seal, without affecting the sealing or dampening capabilities of the damper seal.

Referring to FIGS. 2 and 3, the damper seal 20 is annular in shape having a damper portion 22 and a sealing portion 24. The damper portion 22 includes a plurality of outer scallops 26, or ribs, which define channels 28 between each outer scallop 26 running parallel to the longitudinal axis 40. In addition, inner scallops 30, or ribs, define a passage for receiving a fuel nozzle and the inner scallops 30 define inner channels 32 extending parallel to the longitudinal axis along the length of the scallops 30.

As may be seen in FIG. 4, each of the outer scallops 26 include an apex defining a contact point 26a for contacting a surface defining an inside diameter of a housing into which the damper seal 20 is mounted. Similarly, the inner scallops 30 include an apex defining a contact point 30a for contacting the outer diameter of a tube, such as a fuel nozzle spout, inserted through the damper seal 20.

In the embodiment illustrated, the outer scallops 26 are circumferentially displaced from each other by 60°, and the inner scallops 30 are also circumferentially displaced from each other by 60°. In addition, the outer scallops 26 are circumferentially offset relative to the inner scallops 30 by 30° such that the outer and inner scallops 26, 30, as well as the respective channels 28, 32, are placed at staggered locations around the circumference of the damper seal. The offset or staggered pattern for these scallops 26, 30 facilitates the isolation of vibrations transmitted between a housing supporting the damper seal 20 and a tube extending through the interior of the damper seal 20. Specifically, the offset scallop configuration insures that vibrations traveling through the damper portion 22 of the damper seal 20 do not have a direct path of solid material to travel through when being transmitted through the damper portion 22 in a radial direction. In other words, the present damper portion 22 provides a bridge area 31 of material extending between each of the outer contact points 26a and the inner contact points 30a wherein the channels 28, 32 provide the bridge area 31 with room to flex in the space between a housing and a tube located in engagement with the damper seal 20. Thus, vibrations will be substantially absorbed in the bridge area 31 to provide effective vibration isolation between the housing and the tube located in contact with the damper seal 20.

Another advantage provided by the offset scallop design of the damper portion 22 includes the ability of the damper portion 22 to expand, for example during absorption of fuel or fuel vapors, without substantially affecting the ability of the damper portion 22 to absorb vibrations. In particular, the outer and inner channels 28, 32 provide space for the damper seal to expand in the event that the material forming the damper seal is caused to swell when it is in place between a housing and a tube.

Further, the channels 28, 32 also facilitate insertion of a tube through the damper seal during an assembly operation in that the material forming the damper portion may temporarily move into the areas of the channels 28, 32 in order to permit passage of a tube end, which in certain circumstances may be slightly enlarged beyond the normal diameter of the tube. It should also be noted that as a result of providing contact points 26a, 30a, there is reduced surface contact between the damper seal 20 and the housing and tube surfaces such that frictional resistance to the damper seal 20 being inserted into the housing and the tube being inserted through the damper seal 20 is reduced to thereby also facilitate assembly.

Referring to FIGS. 2, 5 and 6, the damper seal 20 includes an outer seal 34 extending radially outwardly at a 15° angle relative to the longitudinal axis 40, and an inner seal 36 is provided adjacent to the outer seal 34 and extends radially inwardly at an angle of approximately 55° relative to the longitudinal axis 40. A U-channel 38 is defined between the outer and inner seals 34, 36 and facilitates sealing against a housing and a tube in that a fluid pressure exerted from within the housing in the direction of the U-channel 38 will act to bias the outer seal 34 outwardly and the inner seal 36 inwardly into contact with the housing and tube, respectively.

It should also be noted that the outer seal 34 defines an outer diameter which is slightly greater than a diameter defined between outer contact points 26a on diametrically opposing outer scallops. This difference in diameters insures that when the damper seal 20 is inserted into a housing aperture having a diameter adapted to engage the outer contact points 26a, the outer seal 34 will be compressed slightly radially inwardly to thereby form a positive seal between the damper seal 20 and the housing. Similarly, an inner diameter defined by the inner seal 36 is slightly smaller than a diameter defined between contact points 30a on diametrically opposing inner scallops 30 such that a tube having a diameter sufficiently large to engage the contact points 30a will also engage and cause the inner seal 36 to expand slightly outwardly and thereby insure that a positive seal is formed between the tube and the inner seal 36.

Referring to FIG. 5, it should also be noted that each of the inner scallops 30 includes an end surface 42 opposite from the seals 34, 36 which is tapered at approximately a 45° angle with respect to the longitudinal axis 40. The tapered edges of the inner scallops 30 provides a contour for facilitating insertion of the end of a tube or fuel nozzle spout into the damper seal 20.

Referring to FIGS. 7 and 8, the damper seal 20 of the present invention is shown located in a housing 48 with the outer surface of the outer seal 34 slightly compressed radially inwardly to form a seal against the housing 48. A tube 50, or fuel nozzle, positioned in the damper seal 20 engages the inner seal 36 which is expanded slightly radially outwardly and forms a positive seal with the tube 50. It can be seen that the channel 38 allows the pressure in the housing 48 to force the outer seal 34 against the housing 48 and the inner seal 36 against the tube 50. Thus, as the pressure increases the sealing of both inner 36 and outer 34 seals will increase.

As best seen in FIG. 7, the inner scallops 30 engage the tube 50 for maintaining the tube 56 in coaxial relationship with the seal, and the outer channels 28 are shown located in spaced relation to the housing 48. Further, as best seen in FIG. 8, the outer scallops 26 are shown engaged with the housing 48 and the channels 32 are shown located in spaced relation to the tube 50. It should be evident from the above description that, as a result of the inner scallops and outer scallops being circumferentially offset relative to each other, swelling of the damper seal 20 of the present invention will not affect the sealing characteristics of the damper seal. Further, this offset provides the maximum dampening of vibrations to avoid noise being transmitted through the damper seal.

Referring to FIGS. 9–11, an alternative embodiment of the present invention is illustrated. In this embodiment, a damper seal 52 is provided including a plurality of outer ribs or scallops 54 which define longitudinally extending channels 56 located between adjacent scallops 54. In addition, inner ribs or scallops 58a, 58b are located on an inner portion of the damper seal 52 and define longitudinally extending inner channels 60a, 60b.

The damper seal 52 is further provided with sealing edges 62 and 64 which are located radially outwardly from the outer edges of the outer scallops 54 at opposing ends of the damper seal 52. In addition, a centrally located inner seal 66 is located between the inner scallops 58a and 58b and defines an inner sealing surface 68 for engaging a fuel nozzle in sealing engagement as in the previous embodiment. The outer sealing edges 62, 64 are similarly adapted to engage an inside diameter of a housing to thereby provide a sealing interface between the housing and fuel nozzle.

Further, it should be noted that the outer sealing edges 62, 64 and inner seal 66 are adapted to compress when engaged with an inside diameter of a housing and a fuel nozzle, respectively. Thus, the outer scallops 54 and inner scallops 58a, 58b will be positioned in engagement with the respective surfaces on the housing and the fuel nozzle.

As in the previous embodiment, the outer scallops 54 are offset from the inner scallops 58a, 58b such that vibrations will not be transmitted directly through the damper seal 52, but will have to pass through a bridge of material 70. Further, inner channels 72a and 72b are defined between the inner scallops 58a, 58b and the inner seal 66 such that a flexible area is provided between the seal 66 and the inner scallops 58a, 58b.

It should also be noted that inner edges 74a, 74b located at the ends of the damper seal 52 define tapered surfaces on the inner scallops 58a, 58b to facilitate insertion of a fuel nozzle through either end of the damper seal 52. Thus, it should be apparent that the particular orientation of the present damper seal 52 on the fuel nozzle is not critical such that the present damper seal design avoids assembly mistakes which could occur if the damper seal 52 were adapted to be inserted onto the fuel nozzle in only a single direction. In addition, by locating the inner seal 66 at an intermediate position between the inner scallops 58a, 58b, the damper seal 52 is formed as a symmetrical member such that the orientation of the damper seal in its intended use will not affect its sealing or dampening characteristics.

The above-described damper seal provides a seal for use in various applications which can be used in conditions where temperature variations, such as from −40° C. to +140° C., may occur without affecting the sealing and dampening capabilities of the seal. The present seal may also be made out of a less expensive material as compared to past seals in order to accomplish the required sealing and dampening functions. For example, the materials to be used for the present invention could be a fluorosilicone or alternatively NBR. Also, the provision of the channels 28, 32 results in less material being required for the present damper seal than for prior dampers.

Furthermore, the offsetting of the scallops allows a flanged fuel spout or tube to be easily inserted into the seal as compared to the solid seal construction of the prior art construction wherein no channels were provided.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An annular seal for forming a sealing interface between a housing and a tube located within said housing, said seal comprising:

an annular outer seal defining a radially outer surface for engaging said housing in sealing relationship;

an annular inner seal defining a radially inner surface for engaging said tube in sealing relationship, said outer and inner seals being formed coaxially relative to each other and defining a longitudinal axis for said annular seal;

an annular channel defined by said outer and inner seals and disposed intermediate said outer and inner seals, said channel increasing the sealing of said outer and inner seals against said housing and tube, respectively, in response to an increase in pressure within said housing; and a damper portion having inner and outer scallops defining inner and outer longitudinal channels extending parallel to said longitudinal axis, said outer scallops engaging said housing, said inner scallops engaging said tube, said inner and outer scallops dampening vibrations between said tube and said housing.

2. The seal according to claim 1 wherein said outer seal extends outwardly at an angle to engage against an inner face of said housing wherein said outer seal is adapted to resiliently flex radially inwardly during insertion of said seal into said housing.

3. The seal according to claim 2 wherein said outer seal extends outwardly at approximately 15 degrees relative to said longitudinal axis.

4. The seal according to claim 1 wherein said inner seal extends inwardly at an angle to engage against an outer face of said tube wherein said inner seal is adapted to resiliently flex radially outwardly during insertion of said tube into said seal.

5. The seal according to claim 4 wherein said inner seal extends inwardly at approximately 55 degrees relative to said longitudinal axis.

6. The seal according to claim 1 wherein said outer and inner channels are circumferentially offset relative to each other.

7. An annular damper for dampening vibrations between a tube and a housing, said damper defining a longitudinal center axis, and comprising:

inner scallops defining longitudinal channels extending parallel to said longitudinal axis and defining inner surfaces for engaging said tube;

outer scallops defining longitudinal channels extending parallel to said longitudinal axis and defining outer surfaces for engaging said housing, said inner and outer scallops damping vibrations between said tube and said housing;

an annular outer seal defining a radially outer surface for engaging said housing in sealing relationship; and an annular inner seal defining a radially inner surface for engaging said tube in sealing relationship, said outer and inner seals being formed coaxially relative to each other.

8. The damper according to claim 7 wherein said outer and inner scallops are circumferentially offset relative to each other.

9. The damper according to claim 7 wherein
an annular channel is defined by said outer and inner seals and disposed intermediate said outer and inner seals, said channel increasing the sealing of said outer and inner seals against said housing and tube, respectively, in response to an increase in pressure within said housing.

10. The damper according to claim 9 wherein said outer seal extends outwardly at an angle to engage against an inner face of said housing wherein said outer seal is adapted to resiliently flex radially inwardly during insertion of said seal into said housing.

11. The damper according to claim 10 wherein said outer seal extends outwardly at approximately 15 degrees relative to said longitudinal axis.

12. The damper according to claim 9 wherein said inner seal extends inwardly at an angle to engage against an outer face of said tube wherein said inner seal is adapted to resiliently flex radially outwardly during insertion of said tube into said seal.

13. The damper according to claim 12 wherein said inner seal extends inwardly at approximately 55 degrees relative to said longitudinal axis.

14. The damper according to claim 7 wherein said outer seal comprises outer seal portions located at opposing ends of said damper for engaging said housing in sealing relationship, and said inner seal is located substantially centrally between said opposing ends for engaging said tube in sealing relationship.

15. An annular damper seal for forming a sealing interface between a housing and a tube located within said housing, comprising:

an annular outer seal defining a radially outer surface, said outer seal extending outwardly at an angle to engage said outer surface in sealing relationship against an inner face of said housing wherein said outer seal is adapted to resiliently flex radially inwardly during insertion of said seal into said housing;

an annular inner seal defining a radially inner surface, said inner seal extending inwardly at an angle to engage said inner surface in sealing relationship against an outer face of said tube wherein said inner seal is adapted to resiliently flex radially outwardly during insertion of said tube into said seal, said outer and inner seals being formed coaxially relative to each other and defining a longitudinal axis for said annular damper seal;

an annular channel defined by said outer and inner seals and disposed intermediate said outer and inner seals, said channel increasing the sealing of said outer and inner seals against said housing and tube, respectively, in response to an increase in pressure within said housing;

inner scallops defining inner longitudinal channels extending parallel to said longitudinal axis and defining inner surfaces for engaging said tube; and outer scallops defining outer longitudinal channels extending parallel to said longitudinal axis and defining outer surfaces for engaging said housing, said outer and inner channels being circumferentially offset relative to each other, said inner and outer scallops dampening vibrations between said tube and said housing.

* * * * *

UNITED STATES PATENT AND TRADEMARK OFFICE
CERTIFICATE OF CORRECTION

PATENT NO. : 5,454,573
DATED : October 3, 1995
INVENTOR(S) : Peter L. J. Nijland It is certified that error appears in the above-indentified patent and that said Letters Patent is hereby corrected as shown below:

On title page, item [54] and column 1, line 2,
    Title - DAMPER - Should be DAMPER SEAL Signed and Sealed this Twenty-sixth Day of March, 1996

Attest:

BRUCE LEHMAN

Attesting Officer     Commissioner of Patents and Trademarks